July 22, 1958 — E. J. ANDERA — 2,844,124
LIVESTOCK WATERING FOUNTAIN
Filed May 17, 1957 — 3 Sheets-Sheet 1

INVENTOR
E. J. Andera
BY John H. Randolph
ATTORNEY

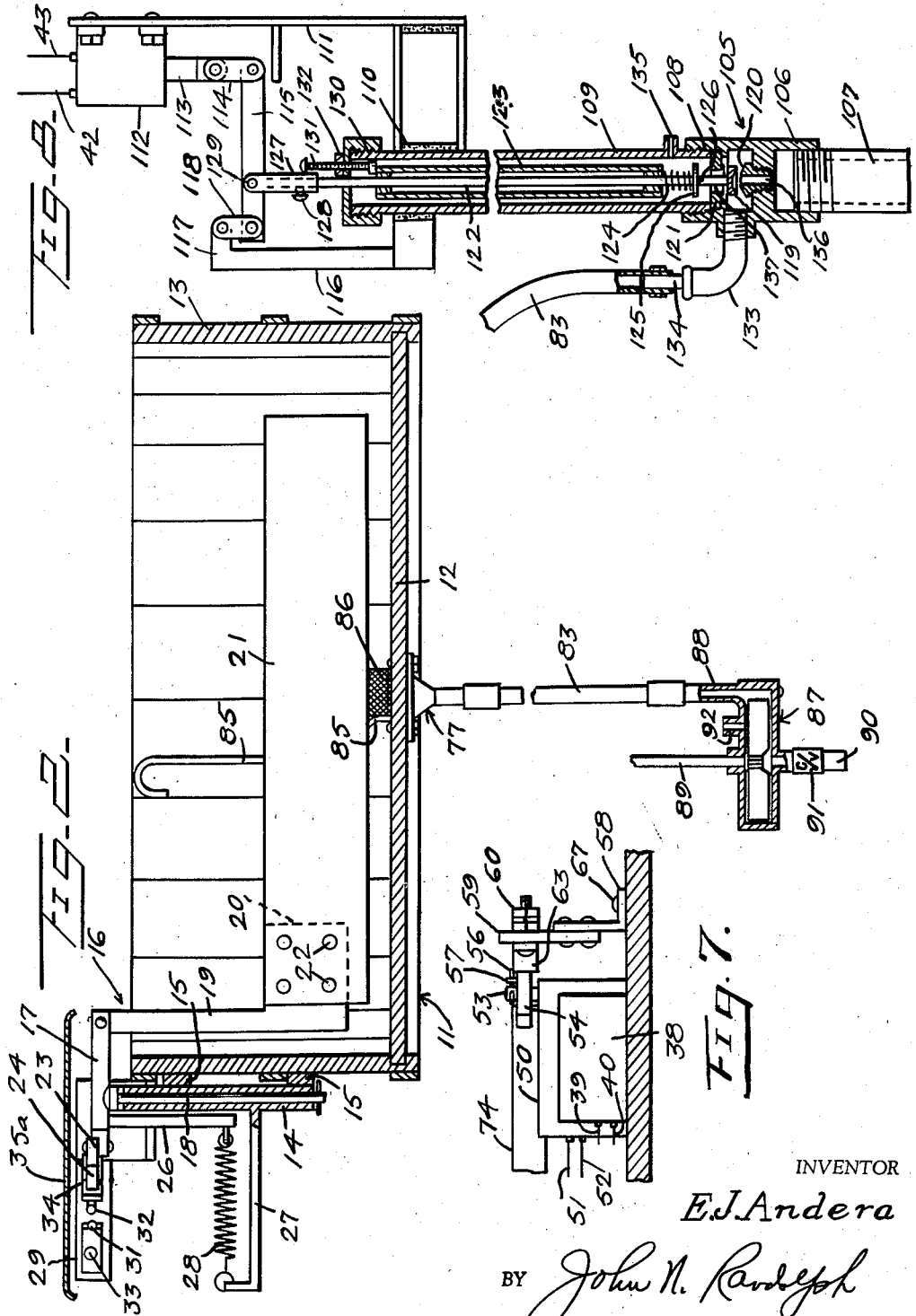

July 22, 1958 E. J. ANDERA 2,844,124
LIVESTOCK WATERING FOUNTAIN
Filed May 17, 1957 3 Sheets-Sheet 3
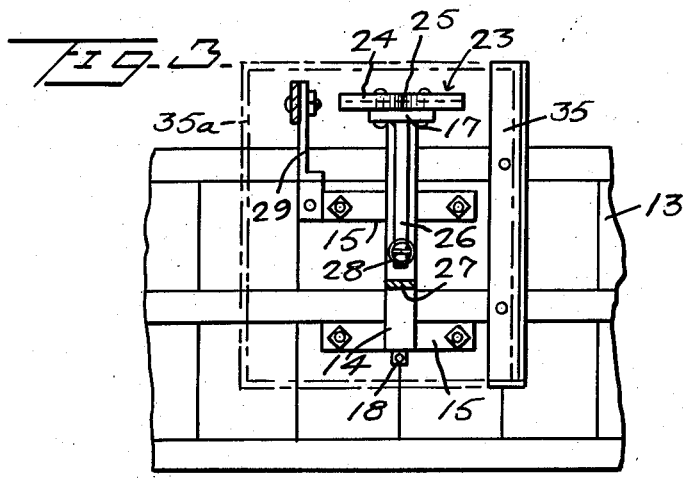
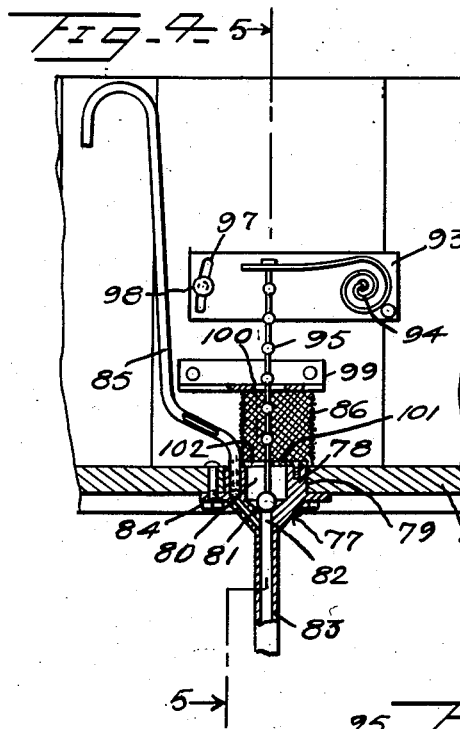
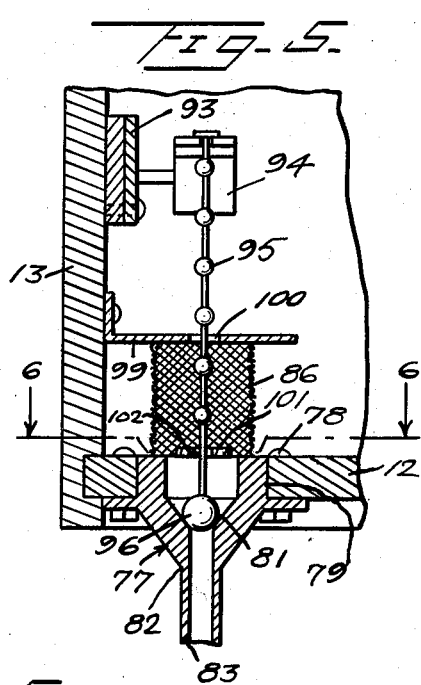
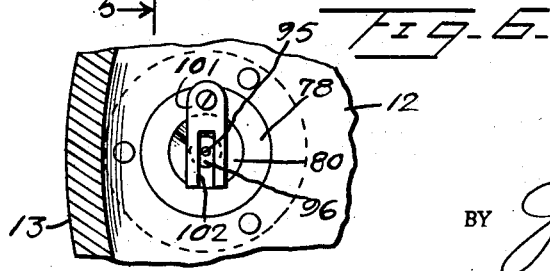
INVENTOR
E. J. Andera
BY John N. Randolph
ATTORNEY United States Patent Office 2,844,124
Patented July 22, 1958

2,844,124

LIVESTOCK WATERING FOUNTAIN

Edward J. Andera, Fort Atkinson, Iowa

Application May 17, 1957, Serial No. 659,919

10 Claims. (Cl. 119—75)

This invention relates to a novel electrically operated apparatus controlled in part by an animal attempting to drink from a receptacle thereof, for supplying fresh water to the receptacle to supply the drinking needs of the animal, and which supply of fresh water is shutoff automatically after a sufficient amount of water has been supplied, after which the water which has not been drunk is permitted to drain from the drinking receptacle to prevent freezing of the water therein.

Another object of the invention is to provide a watering fountain which may be used out-of-doors and without risk of the fountain freezing up and becoming inoperative even in subzero temperatures, and which requires no shelter, heat insulation or heating devices to enable it to function in cold weather, so that the drinking fountain can be operated much more economically than fountains which utilize heaters, and in addition will provide fresh water for the livestock which will encourage a greater consumption of water and thus enhance the growth and development of the livestock.

Still a further object of the invention is to provide a watering fountain utilizing no floats or other mechanism which might interfere with the operation of the fountain under subfreezing conditions.

A further object of the invention is to provide a watering fountain equipped with a thermostaticaly controlled valve to enable the accumulation of water in the drinking receptacle when the temperatures are above freezing and which will automatically permit drainage of the drinking receptacle if the temperature approaches freezing to prevent freezing of the water within the receptacle.

Still another object of the invention is to provide a watering fountain which may be utilized either in conjunction with a well as the source of water supply, or in conjunction with a pressure water system.

Still another object of the invention is to provide a watering fountain having a drainage outlet disposed in a subterranean position below the frost line to prevent freezing of the water at the drainage outlet.

Various other objects and advantages of the invention will hereinafter become more fully apparent from the following description of the drawings, illustrating presently preferred embodiments thereof, and wherein:

Figure 2 is an enlarged vertical sectional view, partly in elevation, taken substantially diametrically through the drinking receptacle of the watering fountain;

Figure 3 is an enlarged fragmentary vertical sectional view, taken substantially along a plane as indicated by the line 3—3 of Figure 1;

Figure 4 is an enlarged fragmentary vertical sectional view, taken substantially along a plane as indicated by the line 4—4 of Figure 1;

Figure 5 is an enlarged fragmentary vertical sectional view, taken substantially along a plane as indicated by the line 5—5 of Figure 4;

Figure 6 is a fragmentary horizontal sectional view, taken substantially along a plane as indicated by the line 6—6 of Figure 5;

Figure 7 is a fragmentary vertical sectional view taken substantially along a plane as indicated by the line 7—7 of Figure 1, and Figure 8 is a vertical sectional view, partly in elevation, illustrating a modified form of the watering fountain.

Figure 1:
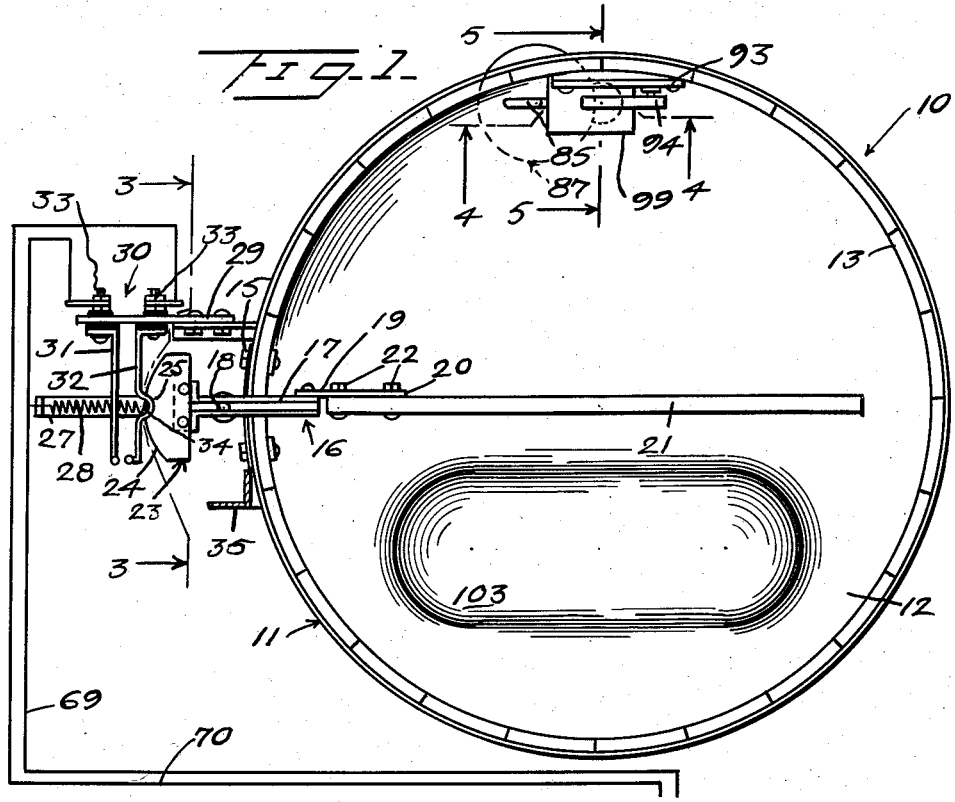
Figure 1 is a plan view, partially diagrammatic, illustrating one form of the watering fountain.
Figure 1A:
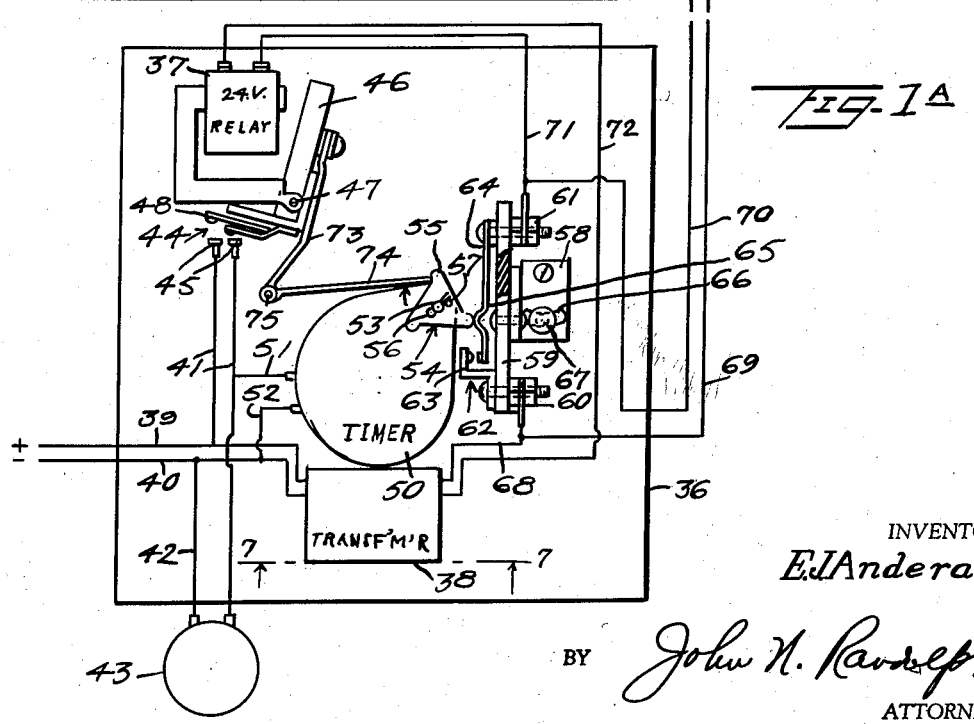
Figure 1A is a front elevational view, partially diagrammatic, of the control panel and parts associated therewith.

Referring more specifically to the drawings and first with reference to Figures 1 to 7, the livestock watering fountain as disclosed therein and in its entirety is designated generally 10 and includes a relatively large open top drinking receptacle, designated generally 11, which is preferably but not necessarily formed of wood and which comprises a substantially flat bottom 12 and an upstanding cylindrical wall 13. A bearing 14 is supported by brackets 15 on the outer side of a portion of the receptacle wall 13 and is disposed substantially vertical. An arm, designated generally 16, includes a top portion 17. A spindle 18 is fixed to and extends downwardly from said top portion 17 and is journalled in the bearing 14 for swivelly mounting said arm 16. A hanger 19 is secured to and extends downwardly from the inner end of the part 17 and is disposed within the receptacle 11 adjacent a portion of the wall 13 thereof and is provided at its lower end with an inwardly extending enlargement 20 which is disposed in a vertical plane. One end of a lever 21 is secured to one side of the enlargement 20 by fastenings 22 and extends therefrom diametrically of the receptacle 11 and has its other free end spaced from a portion of the wall 13 located diametrically opposite the wall portion to which the brackets 15 are secured. The part 17 and lever 21 are disposed on the same side of the hanger 19 so that an extension of the axis of the lever 21 would intersect the axis of the spindle 18. The lever 21 is preferably formed of wood and is disposed in its plane normal to the bottom 12 and with its bottom edge disposed above and spaced from the receptacle bottom 12, as seen in Figure 2.

A cam plate 23 is secured to the opposite outer end of the arm 16 and is spaced outwardly with respect to the spindle 18. The cam plate 23 has a convexly bowed outer edge 24 in the intermediate portion of which is formed a concave notch 25, as best seen in Figure 1.

A hanger arm 26 extends downwardly from the part 17 and is spaced outwardly with respect to the bearing 14. A bracket arm 27 is fixed to the bearing 14 and extends outwardly therefrom, below and spaced from the hanger arm 26. A contractile coiled spring 28 has one end secured to the outer end of the bracket arm 27 and its opposite end secured to the lower end of the hanger arm 26 to resist swinging movement of the arm 16 in either direction from its radial position of Figure 1 relative to the receptacle 11 and for urging said arm 16 to return to such radial position.

A bracket arm 29 is supported by and extends outwardly from one side of an upper one of the brackets 15. An electric switch 30 is supported by the outer portion of the bracket arm 29 and includes a substantially rigid outer switch bar 31 and an inner resilient switch bar 32. Corresponding ends of the switch elements 31 and 32 are connected by contact posts 33 to the bracket 29 in electrically insulated relation to said bracket arm and to one another. The switch element 31 extends laterally from the bracket arm 29 across the outer side of the cam plate 23 and the resilient switch blade 32 is disposed between said cam plate and the switch element 31. The intermediate portion of the switch blade 32 is provided with an arcuately bowed portion 34 which engages conformably in the notch 25, when the arm 16 is disposed radially of the receptacle 11 and when thus disposed, a gap exists as seen in Figure 1 between the opposite free ends of the switch elements 31 and 32 so that the switch 30 is in an "open" or circuit interrupting position.

A standard 35 is secured to the wall 13 and extends upwardly therefrom on the other side of and adjacent the brackets 15 to provide a support for a cover or hood 35a which may be of any suitable size and shape to overlie and shield the switch 30 from the elements.

A panel 36 which may form a part of a box or other enclosure, not shown, has fixed to one side thereof a relay 37, and a transformer 38. Wires 39 and 40 of a power line leading from a current source connect with the transformer 38 and branch wires 41 and 42 extend from the power line 39, 40 and connect with an electric motor 43 which is disposed remote from the panel 36, as for example, beneath a portion of the fountain receptacle 11. A normally open switch 44 including spaced contacts 45 which form a break in the conductor wire 41, normally maintains the motor 43 de-energized. The armature 46 of the relay 37 is pivotally mounted at 47. A bridge 48, formed of electrical conducting material and constituting a part of the switch 44, is supported by the armature 46 for swinging movement therewith and is normally urged to a position out of engagement with the switch contacts 45 by gravity.

An electric clock mechanism or its equivalent 50 is preferably mounted on panel 36 just above transformer 38 and is connected by conductor wires 51 and 52 to the power line 39, 40. The conductor wire 51 is connected to the power line conductor 39 by the conductor wire 41 and said wire 51 connects with the wire 41 between the motor 43 and switch 44 so that said switch 44 also controls the clock mechanism 50 which is likewise de-energized when the switch 44 is in its normal open position, as illustrated in Figure 1. A rotary driven shaft 53, forming a part of the clock mechanism 50, extends outwardly therefrom. A can member 54 is rotatably mounted on the shaft 53 and is provided with a plurality, preferably three, equally spaced lobes 55. A pin, such as a cotter pin 56, extends through the driven shaft 53 outwardly of the cam 54. A stud 57 is fixed to and extends outwardly from a portion of the cam 54 and is disposed in the path of rotation of a part of the pin 56.

A bracket 58 is fastened to and extends outwardly from the panel 36 and has a bar 59 of electrical insulating material secured to the outer end thereof and to which contact posts 60 and 61 are connected in electrically insulated relation to one another. An electric switch 62 includes a stationary contact 63 which is supported by the post 60 and a spring blade 64, forming the resilient contact of the switch 62, which is supported by the post 61. Said switch 62 is disposed on the side of the bar 59 which faces the cam 54 and the free end of the switch blade 64 is normally spring biased into engagement with the fixed contact 63. The intermediate portion of the blade 64 includes an arcuate portion 65 which is bowed toward the cam 54 and which is normally engaged by one of the lobes 55 for holding the free end of the switch element 64 out of engagement with the contact 63 to maintain the switch 62 in an open position. The bracket 58 has a slot 66 in the part thereof which engages on the base 36 and which is engaged by a clamping fastening 67 so that the bracket 58 and bar 59 may be swung toward or away from the cam 54 to vary the extent that the switch element 64 will be sprung toward the bar 59 and out of engagement with the contact 63 when the portion 65 is engaged by a cam lobe 55.

A conductor wire 68 connects the transformer 38 to the post 60 and a conductor wire 69 leads from the wire 68, between the transformer 38 and post 60, and connects with the post 33 of the stationary switch contact 31. A conductor wire 70 leads from the post 33 of the resilient switch contact 32 to the contact post 61 and a conductor wire 71 forms a connection between the wire 70 and one post of the relay 37. A coductor wire 72 connects the other post of the relay 37 to the transformer 38.

A bar 73 is secured to the armature 46 and extends across the pivot 47 thereof and has a free end to which an arm 74 is pivotally connected as seen at 75. The other free end of the arm 74 engages the cam 54 and is urged to swing toward the axis of said cam by gravity.

As seen in Figures 4 and 5, a drain and supply fitting 77 is secured to the receptacle bottom 12 remote from the center thereof and from the lever 21 and has an upwardly opening internally recessed upper portion 78 which extends upwardly through and is snugly received in an opening 79 of the bottom 12. An upwardly opening cavity 80 of the portion 78 has a tapered bottom 81 forming a valve seat. A restricted passage 82 extends downwardly from the valve seat 81 and communicates with a hose or flexible conduit 83 which is connected to the lower end of the fitting 77. A branch passage 84 extends upwardly from the passage 82 around the cavity 80 and has an upper end opening into the receptacle 11 in which is mounted the lower end of a vent tube 85. The vent tube 85 has a downwardly opening upper end located adjacent the top of the receptacle 11. The fitting 77 is preferably provided with a filter 86.

A pump, such as a centrifugal pump 87, is disposed in a subterranean position below the frost line and has an upwardly extending outlet 88 connected to the lower end of the hose or conduit 83. The impeller of the pump 87 is driven by a rotary drive shaft 89 of the motor 43, which may be located in any desired position above said pump. A tube or pipe 90 leads downwardly from the inlet of the pump 87 to a well or similar water supply source, not shown, and is preferably provided with a check valve 91 so that water will be maintained at all times within the casing of the pump 87. The pump 87 is provided with an upwardly opening drain port 92 by which the water is drained from the receptacle 11.

A plate 93 is mounted on the wall 13 within the receptacle 11, above and adjacent the fitting 77, and supports a thermostat 94 from which a chain 95 is suspended. A valve 96 is attached to the lower end of the chain 95 and normally rests on the valve seat 81. The plate 93 has an arcuate slot 97 which is engaged by a clamping fastening 98 so that said plate can be adjusted upwardly or downwardly to vary the elevation of the portion of the thermostat 94 to which the chain 95 is attached. A deflector plate 99 is secured to the wall 13 and is disposed over the fitting 77 and between and spaced from said fitting and the plate 93. The deflector 99 has an opening or notch 100 through which the chain 95 lossely extends. A bar 101 is secured to the top surface of the fitting 77 and spans the open top of the cavity 80, as best seen in Figure 6. Said bar 101 has a notch 102 through which a portion of the chain loosely extends.

Assuming that the parts in the positions as illustrated in Figures 1 to 6 and that an animal in attempting to drink from the receptacle 11 presses against the lever 21, when this occurs, said lever 21 and the arm 16 will swing relative to the bearing 14 causing swinging movement of the cam plate 23 from its position of Figure 1. The portion of the receptacle bottom 12 located remote from the fitting 77 is preferably disposed slightly below the level of the bottom portion located adjacent said fitting 77 or said remote portion may be slightly dished, as indicated at 103 in Figure 1, so that a slight amount of water will be collected in the area 103 to attract the animal and cause it to press against the lever 21, as previously described. When the cam plate 23 is swung from its position of Figure 1, as previously mentioned, the switch portion 34 will be cammed out of the notch 25 and into engagement with the edge 24 of the cam plate 23. This will cause the resilient switch element 32 to be sprung toward and into electrical contact with the switch element 31 for closing the switch 30. The switch 30 completes the electric circuit to the relay 37 around the switch 62.

When the relay 37 is energized its armature 46 is swung counterclockwise as seen in Figure 1 about the pivot 47 causing the conductor bridge 48 to engage contacts 45 for thus closing the switch 44 to complete the electric circuit to the motor 43. The pump 87 will be operated when the motor 43 is energized for pumping water upwardly through the fitting 77 into the receptacle 11. The deflector 99 will prevent the water from splashing from the receptacle 11 and the bar 101 will prevent the valve 96 being ejected from the cavity 80 by the pressure of the water, so that when the upward flow through the fitting 77 ceases, the valve 96 can resume its closed position of Figures 4 and 5 for trapping the water in the receptacle 11, if the temperature is above freezing and it is desirable to retain water in the receptacle.

The thermostat 94 is set so that should the temperature drop to nearly freezing, contraction of the thermostat will cause a lifting of the chain 95 and valve 96 to allow the water to escape from the receptacle 11 through the fitting 77. The vent passage 84 and tube 85 provide a vent for the lower portion of the fitting 77 to dissipate a partial vacuum which might otherwise occur therein and which could prevent upward movement of the valve 96 to an open position. Where the watering fountain is used under subfreezing conditions the valve 96, chain 95, thermostat 94 and bar 101 may be omitted together with the vent tube 85. The water draining through the fitting 77 and hose 83 will escape through the upwardly opening drain port 92 which is disposed below the frost line so that water will not freeze around and seal said drain port.

Counterclockwise swinging movement of the armature 46 from its position of Figure 1 will cause the arm 74 to move from left to right and exert a thrust against one of the lobes 55 which is disposed in the path of movement of said arm 74 for turning the cam 54 clockwise relative to the shaft 53 to move another lobe 55, which is in engagement with the strip portion 65, out of engagement therewith, so that the strip 64 will be spring biased by its resiliency into engagement with the contact 63 to close the switch 62 which also completes a circuit by way of the wiring 68, 71, 72 to the relay 37. Thus, even though the animal only momentarily swings the lever 21 from its position of Figure 1, as soon as this occurs, the relay 37 is energized which immediately causes the arm 74 to be moved sufficiently to turn the cam 54 so that the switch 62 can assume a circuit closing position to maintain the relay energized after the lever 21 and cam 23 have returned to their positions of Figure 1, allowing the normally open switch 30 to resume its open position. The spring 28 is tensioned by swinging movement of the lever 21 in either direction from its diametrical position of Figure 1 so that when pressure is released from said lever, the spring 28 will promptly return the parts to their positions of Figure 1. It will also be apparent that closing of the switch 44, as previously described, will complete the circuit to the electric clock mechanism 50, operation of which will cause the shaft 53 to turn clockwise as seen in Figure 1 for moving the pin 56 toward the stud 57, which stud has previously turned with the cam 54 clockwise away from the pin 56 when the cam was turned by the thrust of the arm 74. Accordingly, the switches 62 and 44 will be maintained in closed positions while the shaft 53 turns through an arc of 120° and during which time water will be supplied to the receptacle 11. After the pin 56 has moved back into engagement with the stud 57 the cam 54 will be turned clockwise with the shaft 53 and the lobe 55 which is disposed in a trailing position relative to the lobe previously engaged by the arm 74 will contact the free end of the arm 74 to swing it about its pivot 75 away from the cam 54, so that said lobe can pass the free end of the arm. As the lobe clears the free end of the arm 74, the lobe 55 in advance thereof will have moved into contact with the strip portion 65 to force the strip 64 toward the bar 59 and out of engagement with the contact 63 to open the switch 62. This will break the electric circuit to the relay 37 and will allow the armature 46, conductor bridge 48 and arm 74 to return by gravity to their positions of Figure 1. This will result in an opening of the switch 44 which will de-energize the motor 43 and clock mechanism 50 to stop operation of the pump 87 so that the water will be drained from the receptacle 11, unless the valve 96 is disposed to return to a position on the seat 81.

The container or receptacle 11 is preferably formed of wood because it is a poor conductor of heat and cold and does not affect the temperature of the water and will not tend to hasten freezing of the water. The starting lever 21 is also formed of wood as livestock will press against the wooden lever but would avoid contact with said lever if formed of other material such as metal. The transformer 38 is preferably placed beneath the clock mechanism 50 for warming the clock mechanism so that it will start instantly even in very cold weather.

Figure 8 illustrates a slight modification of the watering fountain for use where hydrant water or water under pressure is available. Where the parts as shown in Figure 8 are employed, the electric motor 43 and pump 87 are dispensed with and a valve housing 105 has an open lower end 106 which is attached to the upwardly opening end of a supply pipe 107 leading from a source of water supply under pressure. The valve housing 105 has an internally threaded upper end 108 in which is mounted the lower end of a pipe 109. A bracket 110 is secured to an upper portion of the pipe 109 and is disposed above ground level. A standard 111 rises from one end of the bracket 110 and a solenoid 112 is secured to and supported by the upper portion of the standard 111. The conductor wires 41 and 42, shown in Figure 1 connected to the electric motor 43, are instead connected to the two contact posts of the solenoid 112, when the modification of Figure 8 is utilized. The armature 113 of the solenoid 112 extends downwardly therefrom and has a pair of links 114 pivotally connected thereto and depending therefrom. One end of a bar 115 is pivotally connected to the lower ends of the links 114. A standard 116 rises from the other end of the bracket 110 and has an inturned upper end 117 to which another pair of links 118 are pivotally connected. The links 118 extend downwardly from the standard portion 117 and have their lower ends pivotally connected to the other end of the bar 115 which is thus suspended above the upper end of the pipe 109.

A valve 119 is disposed within the intermediate portion of the valve housing 105 between a lower valve seat 120 and an upper valve seat 121 thereof. A valve stem 122 has a lower end secured to the valve 119 and extends upwardly therefrom through the annular upper valve seat 121 and through the pipe 109. A sleeve 123 is loosely mounted on the valve stem 122. A compression spring 124 is disposed on the valve stem 122 between the lower end of the sleeve 123 and a washer 125. The washer 125 is supported by a pin 126 which extends through the stem 122.

The upper end of the valve stem 122, above the pipe 109, is adjustably secured in a sleeve or socket 127 by a setscrew 128. The upper end of the sleeve or socket 127 is pivotally connected to the bar 115, at 129. The stem 122 extends slidably through a cap 130 which is threadedly mounted on the upper end of the pipe 109. A screw 131 is threaded downwardly through the cap 130 against the upper end of the sleeve 123 for adjustably displacing said sleeve downwardly to compress the spring 124 for urging the valve stem 122 downwardly with sufficient force to cause the valve 119 to be retained in sealing engagement on the seat 120 against the pressure of the water from the supply pipe 107 which tends to unseat said valve. A lock nut 132 is carried by the screw 131 to retain said screw in different adjusted positions.

One end of a coupling member 133 is tapped into the valve housing 105 between the valve seats 120 and 121. The lower end of the hose 83 is connected to the restricted opposite end 134 of the coupling 133, rather than to the pump outlet 88, where the unit as illustrated in Figure 8 is employed. The pipe 109 above and adjacent the valve housing 105 is provided with a drain port 135 which, like the drain port 92, is adapted to be disposed below the frost line, for the same reasons as previously described in reference to said drain port 92.

When the switch 30 is closed to cause a closing of the switch 44 and a subsequent closing of the switch 62, the livestock watering fountain will operate in the same manner as previously described except that the solenoid 112, instead of the motor 43 will be energized. The armature 113 will be drawn upwardly to cause the bar 115 to swing upwardly about its connection to the links 118 for exerting an upward pull on the valve stem 122 to lift the valve 119 out of engagement with the valve seat 120 and into engagement with the valve seat 121. Water under pressure will then flow upwardly from the supply pipe 107 through the bore 136 of the valve seat 120, through the coupling 133 and conduit 83 into the fitting 77, from which the water will enter the receptacle 11 in the same manner as previously described. The water is drained from the receptacle 11 through the fitting 77 and conduit 83 back through the coupling 133 into the valve housing 105. This drainage of the water occurs after the solenoid 112 is de-energized and the spring 124 has returned the valve 119 into engagement with the valve seat 120 for closing the intake passage or nozzle 136 to stop the flow of water from the pressure supply pipe 107 into the valve housing. When the valve 119 resumes its position on the valve seat 120 the upper port 137 which is surrounded by the valve seat 131 is exposed so that the water can flow upwardly therethrough into the lower portion of the pipe 109 and escape therefrom through the drain port 135.

Various modifications and changes are contemplated and may be resorted to, without departing from the function or scope of the invention as hereinafter defined by the appended claims.

I claim as my invention:

1. A livestock watering fountain comprising an open top receptacle, a combination supply and drain fitting connected to and opening through the receptacle bottom, a conduit leading downwardly from said fitting and adapted to be connected to a source of water supply, a hanger member, means supported by the receptacle supporting said hanger member for movement relative to the receptacle, an animal actuated element connected to a part of said hanger member and supported thereby for movement within the receptacle, a first normally open electric switch supported by a part of said supporting means externally of the receptacle, a cam supported by said hanger member and disposed to engage a part of said switch for closing the switch when the hanger member and animal actuated element are moved from a neutral position, spring means connected to the hanger member and said supporting means for returning the hanger member and animal actuated element to a neutral position, means interposed in said conduit for controlling the supply of water therethrough to the receptacle, an electrically actuated device connected to and operating said water control means and interposed in an electric circuit with said first switch, a second normally open switch for breaking the electric circuit to said electrically actuated device, a relay electrically connected to and controlled by said first switch including a movably mounted armature connected to a part of said second switch for closing the second switch when the relay is energized and for opening said second switch when the relay is de-energized, a third normally closed electric switch for closing the electric circuit to said relay, a second cam having circumferentially spaced lobes, a shaft on which said second cam is rotatably mounted for positioning said second cam for engagement of one lobe thereof with a part of said third switch when the second cam is revolved, said third switch being held in a circuit interrupting position by engagement of one of the cam lobes with said switch part, means connected to the relay armature and actuated by movement of the armature when the relay is energized for engaging and turning the cam to disengage a lobe thereof from said third switch part to permit the third switch to resume a circuit closing position, an electrically driven mechanism controlled by said second switch for operation simultaneously with said means controlling the supply of water for turning said shaft relative to said second cam, and means carried by said shaft and movable therewith into engagement with means carried by said second cam for causing the second cam to turn with said shaft for moving a lobe thereof into engagement with said part of the third switch to return the third switch to an open position.

2. A livestock watering fountain as in claim 1, and a drain port formed in said water supply conduit for draining the water from the receptacle through the fitting and through the portion of the conduit disposed between said fitting and said means controlling the water supply when said second switch is in a circuit interrupting position.

3. A livestock watering fountain as in claim 1, said means controlling the supply of water to the receptacle comprising a pump, and said electrically actuated device comprising an electric motor for driving said pump.

4. A livestock watering fountain as in claim 1, said water supply conduit being adapted to be connected to a source of water supply under pressure, said means controlling the supply of water including a valve and spring means normally holding said valve in a position for shutting off the water supply, said electrically actuated device comprising a solenoid connected to said valve for moving the valve against the action of the spring means to a position to permit the passage of water from the supply source through said conduit and fitting to the receptacle.

5. A livestock watering fountain as in claim 4, said conduit being provided with a drain port, said valve being movable to a position for closing the connection of the drain port and conduit when the valve is actuated by the solenoid and being moved to a position to permit drainage through the drain port from said conduit when the solenoid is de-energized and the valve is returned by the spring means thereof to a position for shutting off the supply of water under pressure.

6. A livestock watering fountain as in claim 1, a valve for closing said fitting to prevent drainage of water from the receptacle, said valve being opened by the pressure of water flowing toward the receptacle.

7. A livestock watering fountain as in claim 6, a thermostat connected to said valve for opening said valve when the ambient temperature falls to a predetermined low to permit drainage of the water from the receptacle to prevent freezing of the water therein.

8. A livestock watering fountain as in claim 1, said receptacle having a bottom portion disposed below the level of the top of said fitting and located adjacent said animal actuated element to permit accumulation of a small amount of water in the bottom of the receptacle and in a location such that the animal actuated element will be engaged and moved by an animal attempting to reach the water.

9. In combination with an open top livestock drinking receptacle, a conduit having one end opening through the receptacle bottom and an opposite end adapted to be connected to a source of water supply, control means interposed in said conduit for controlling the supply of water therethrough to the receptacle, an electrically actuated device for operating said control means, a first normally open electric switch for normally maintaining said electrically actuated device de-energized, electrically actuated means for closing said first switch when said electrically actuated means is energized, a second normally open switch, means movably disposed within said receptacle and adapted to be actuated by an animal attempting to drink from the receptacle for closing said second switch for completing an electric circuit to said electrically actuated means, a third switch for closing an electric circuit to said electrically actuated means, means actuated by said electrically actuated means when said second switch is closed for releasing said third switch to assume a circuit closing position, and a timing mechanism controlled by said first switch and operable to effect movement of a part of said last mentioned means to return the third switch to a circuit interrupting position after a predetermined time lapse.

10. In an apparatus as in claim 9, and a spring urging said animal actuated means to a position to permit return of said second switch to a circuit interrupting position.

References Cited in the file of this patent
UNITED STATES PATENTS

| | | |
|---|---|---|
| 1,896,860 | Beyer | Feb. 7, 1933 |
| 2,664,069 | Anderson | Dec. 29, 1953 |